United States Patent
Thomas

(10) Patent No.: US 6,498,939 B1
(45) Date of Patent: Dec. 24, 2002

(54) WIRELESS NETWORK

(75) Inventor: David R. Thomas, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/614,351

(22) Filed: Jul. 12, 2000

(51) Int. Cl.[7] .......................... H04B 1/38; H04M 1/00
(52) U.S. Cl. ..................... 455/562; 455/550; 455/69; 455/279.1
(58) Field of Search .................. 455/431, 562, 455/561, 550, 135, 428, 434, 445, 450, 452, 440, 67.1, 279.1, 69, 63, 278.1, 272, 277.1; 370/280, 112; 342/383, 378

(56) References Cited

U.S. PATENT DOCUMENTS

| | | | | |
|---|---|---|---|---|
| 5,615,409 A | * | 3/1997 | Forssen | 455/440 |
| 5,646,942 A | * | 7/1997 | Oliver | 370/312 |
| 5,940,033 A | * | 8/1999 | Locher | 342/378 |
| 5,952,968 A | * | 9/1999 | McDowell | 342/383 |
| 6,016,311 A | * | 1/2000 | Gilbert | 370/280 |
| 6,018,659 A | * | 1/2000 | Ayyagari | 455/431 |
| 6,128,488 A | * | 10/2000 | Sauvageot | 455/428 |
| 6,317,586 B1 | * | 11/2001 | Haardt | 455/67.6 |

OTHER PUBLICATIONS

G.E. Athanasiadou et al., a Ray Tracing Algorithm for Microcellular Wideband Propagation Modelling, IEEE, 1995, pp. 261–265, vol. 0–7803–2742–X/95, Centre for Communications Research, University of Bristol, Queen's Building, University Walk, Bristol BS8 1TR, UK, Chicago, USA.

A.R. Nix, et al., Predicted HIPERLAN Coverage and Outage Performance at 5.2 and 17 GHz Using Indoor 3–D Ray–Tracing Techniques, Wireless Personal Communications, pp. 365–388, vol. 3, Centre for Communications Research, Queen's Building, University of Bristol, University Walk, Bristol BS8 ITR UK, 1996 Kluwer Academic Publishers. Printed in the Netherlands.

M.R. Williamson, et al., Investigating the Effects of Antenna Directivity on Wireless Indoor Communication at 60 GHz, Centre for Communications Research, Jun. 1997, pp. 1–6, University of Bristol, Merchant Ventures' Building, Woodland Road, Bristol BS8 1UB, UK.

\* cited by examiner

*Primary Examiner*—Vivian Chin
*Assistant Examiner*—John J Lee
(74) *Attorney, Agent, or Firm*—William B. Kempler; W. James Brady; Frederick J. Telecky, Jr.

(57) ABSTRACT

An antenna network system comprises a server including a transmitter and an antenna, and a client including a receiver and a steerable antenna. There is also included a control path which is independently operable of the antennas for communicating control data between the server and client. The server is responsive to signal quality data communicated via the control path for steering at least one of the server antenna and client antenna in a direction for optimising the signal quality of communications transmitted between them.

21 Claims, 5 Drawing Sheets

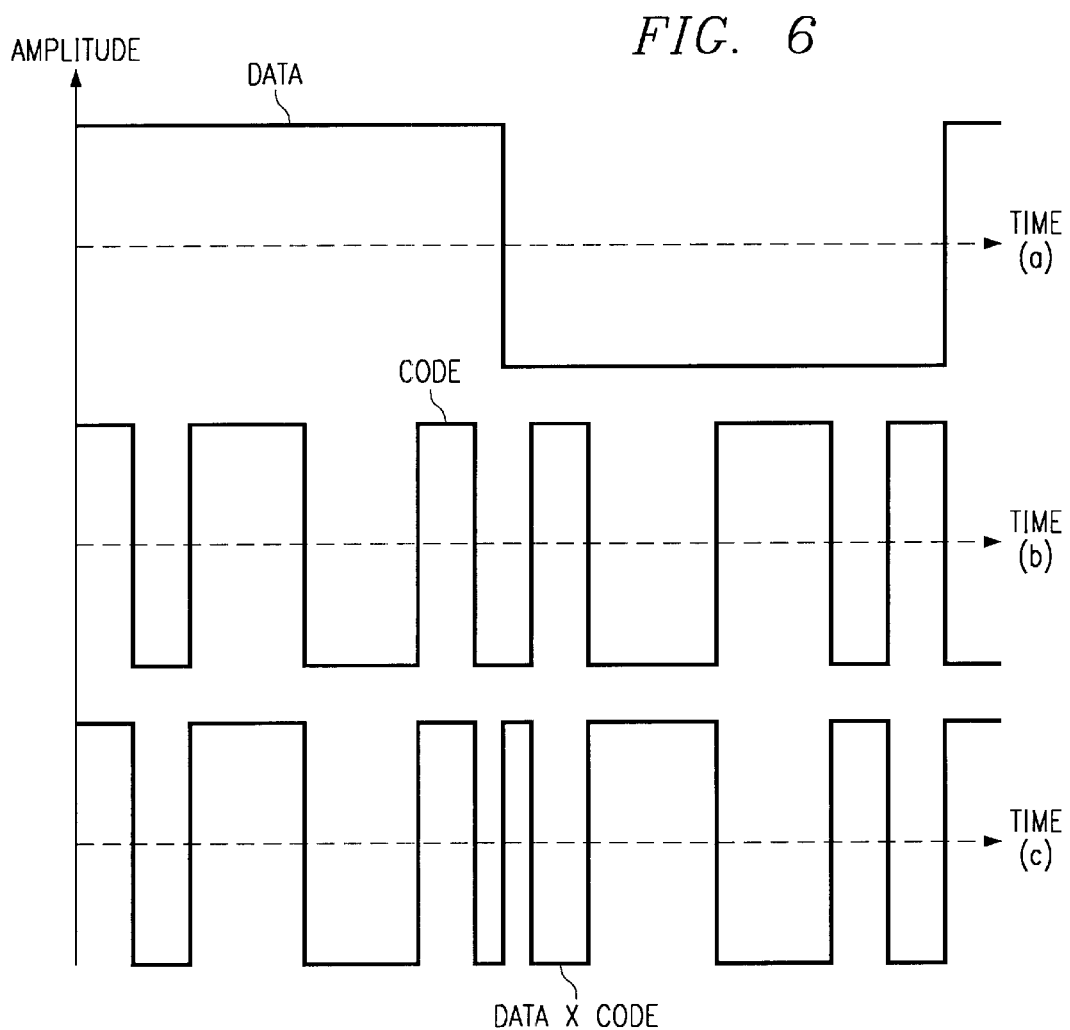

WIRELESS NETWORK

This invention relates to wireless networks, in particular to wireless networks in enclosed environments such as, for example, a home or office.

With the growing use of computer systems such as PCs within office or working environments provision of suitable conduits for the necessary cabling, in particular network cables, has become increasingly difficult. Furthermore, working environments are often altered such as rearranging an open-plan office, or reorganising partitions in an environment having conventional offices. In production facilities the increasing reliance on information technology makes computer networks essential—yet, again, the cabling requirements pose significant difficulties.

With the rapid increase in the number of multimedia appliances (e.g. video equipment, home theatres, PCs, etc) being used in the home, there is also a growing requirement for a network for controlling and connecting such multimedia appliances which is not unsightly. Such networks need to be easy to install, easy to set up, easy to maintain and easy to use. The required network should link the above-described home, office or production appliances to each other and to wide area networks such as, for example, the Internet, video servers or other communications media, via a central server.

It has been proposed to use wireless communication media for such networks which offer advantages over wired systems in that they are easy to physically install and such systems are known for use in the control of television systems, communication of audio signals to remote speakers, communication between a PC and a printer, and the like.

In such a wireless network, individual apparatus are linked to each other and/or a central server system by wireless communications and each apparatus can typically transmit and receive wireless signals. Such a system may be termed a wireless LAN However, there is a need to transmit digital data at every increasing data rates for multimedia information. The carrier frequencies required for such data rates are at least in the Gigahertz (GHz) range. At carrier frequencies in the Gigahertz range, communication systems suffer from the effects of reflections and attenuation from walls, windows and partitions, etc, typically found in work or home environments which can affect the Bit Error Rate (BER) performance of the system, thereby resulting in retransmission of data and an undesirable or even unacceptable reduction in data throughout. A source of poor BER performance at so-called medium carrier frequencies, i.e. in the range about 2 to 15 GHz, is that reflections manifest themselves as sources of multipath propagation that can result in inter-symbol interference at a receiving apparatus. Additionally, many applications involve compressed video or audio and it is preferable for the data to arrive at the receiver in the correct order to avoid excessive buffering and delays, and/or complex error correction algorithms and processing circuitry to compensate for any lost or corrupted data.

In the case of medium frequency systems (2 to 15 GHz carrier frequencies), multipath signals at the receiver give rise to inter-symbol interference in the demodulated data stream. To reduce the effect of such multipath propagation, the system must utilise complex echo cancellation or equalisation techniques. In this application, the steerable antenna can be used to amplify the gain of the primary signal whilst attenuating the multipath signals with nulls, thus simplifying the echo cancelling requirements. Alternatively, in the case of a CDMA system where one wishes to increase the signal received from multipath signals at the input to the RAKE receiver, the steerable antenna can be used to increase the strength of the signal received at the RAKE receiver.

At very high carrier frequencies, i.e. in the range about 15 to 60 GHz, the attenuation due to walls or partitions, etc, gives rise to significant received signal power level problems, where the transmitting apparatus and receiving apparatus are not in line of sight. If there is excessive BER, the system performance and overall quality of audio-visual degrades due to the need for retransmission of erroneous data. At such high frequencies, it may be possible to only detect a signal resulting from a reflection from a partition or wall.

For very high carrier frequencies, simulation results show that the amount of diffusion of power through partitions and doors, etc is low and is highly dependent upon the material and construction of partitions and the position of furniture, for example. In addition, small changes in the-environment affect the propagation of RF within the building. At these frequencies (15 to 60 GHz), a reasonable level of reflection from walls and/or internal or external objects (via doors, windows, and the like) in the environment can be anticipated as disclosed in publication "Predicted HIPERLAN coverage and outage performance at 5.2 and 17 GHz using indoor 3D Ray tracing techniques" A R Nix et al, Wireless Communications Journal 1996.

Experimental results published in the literature, i.e. "Investigation of the Effects of Antenna Directivity on Wireless Indoor Communication Systems at 60 GHz" by M R Williams et al, Proceedings of Workshop on Wireless Multimedia Communication Systems, Kings College, June 97, show that the bit error rate (BER) performance of a wireless communication system can be dramatically improved by the use of highly directional antennas. In theory, optimum performance can be achieved if the beams of both the transmitter and receiver are aligned on the line of sight and the angle of spread of the beams are minimised in order to reduce reflections and multipath propagation. It is apparent that, as the beams narrow, a concomitant accuracy of beam alignment must be maintained. Also, the narrower the beam, the more rapid the degradation in performance if the beam goes out of alignment.

In the majority of home and work environments, it is highly improbable that line of sight communication between all appliances can be achieved, especially to those appliances that are ergonomically located. In a practical situation, in order to provide communication at such high frequencies, reliance upon reflections within the building or via windows to and from external objects or diffusion or diffraction through and under partitions and doors would be required in addition to, or alternatively to, line of sight, where possible, to maximise the likelihood of obtaining signal power levels suitable for communication.

In order to reduce the problems with unwanted reflections and poor signal strength due to attenuation through walls or partitions, etc, it is desirable to provide antennas which are directional so that they transmit and receive in narrow directions only. Thus, by properly aligning the directional antennas, the transmission problems giving rise to poor BER may be mitigated.

Although it is possible to create a computer simulation of the effects of a building on the propagation of a radio signal and to define the optimum position of transmitting and receiving antennas, and their direction of propagation, it is an impractical solution since the environment (location of obstructions, number and location of equipment, etc) often changes. Such a wireless home or work network is difficult to set up and maintain without continual adjustment and therefore further computer simulation.

Such an approach relies upon complex simulation of the transmission characteristics of the environment taking into account an accurate geometric map of the environment, the physical properties of materials comprising partitions and the effect of reflections from objects that are exterior of the building (reference "A Ray Tracing for Microcellular Wideband Propagation Modelling", G E Athanasiadou et al, IEEE, VTC, Chicago, 1995). Any modification to the environment leads to either a requirement for a new simulation and repositioning of antennas or the possible degradation of the performance of the network.

In accordance with a first aspect of the present invention, there is provided an antenna network system, comprising:

a server including a transmitter and an antenna;

a client including a receiver and a steerable antenna;

a control path independently operable of a primary wireless communications channel between said antennas, the control path for communicating control data between said server and client; and server control means responsive to signal quality data communicated via said control path for steering said client antenna in a direction for optimising signal quality of communications transmitted between said antennas.

In accordance with a second aspect of the present invention, there-is provided a method for automatically calibrating an antenna network system including a server antenna and steerable client antenna, the method comprising:

transmitting a wireless signal from said server antenna;

receiving said wireless signal at said client antenna for each one of a plurality of directions for said client antenna;

noting received signal quality for respective client antenna directions; and steering said client antenna in a direction for optimising said received signal quality.

In a preferred embodiment, the method comprises steering the server antenna in a plurality of directions, and receiving the wireless signal at the client antenna for each one of the plurality of directions of the client antenna for each of the plurality of directions for the server antenna. Thus, it is possible to build up measurements of the received signal quality for each combination of client and server antenna directions. Having the control path independent of the primary wireless communications channel means that control data can be exchanged even if there is a breakdown in the primary communications channel.

Preferably, data corresponding to the noted received signal quality for respective client antenna directions is communicated to the server over the control path at a lower data rate than the data rate for the primary wireless channel. Typically, such data comprises respective received signal quality values and corresponding client antenna direction information. By having the control path operable at a low data rate, low carrier frequencies may be used and thus suitable communications media for such low carrier frequencies may be utilised. Suitable low carrier frequencies would be lower than about 1 GHz.

Suitably, the server forms a database of the data forwarded to it from the client antenna over the control path and searches said database to identify a client antenna direction yielding optimum signal quality. The method further comprises communicating control signals over the control path to the client antenna for steering the client antenna in the identified optimum direction.

Optionally, the method further comprises including in the database data corresponding to the server antenna direction for each of the data recorded for the client antenna, searching for a server antenna direction and client antenna direction pair yielding optimum signal quality, and steering the server antenna and the client in respective directions for that optimum signal quality. Steering of the client antenna being achieved by forwarding suitable control signals over the control path.

Preferably, the control path comprises a power supply line including a suitable modem/s, telephone system, cable system or cordless telephone system, for example the DECT telephone system. One or other of such systems are particularly advantageous, since they can be operated at relatively low frequencies and/or data rates and can provide substantially continuous communication for control signals between the server and the client. Optionally, the control path is wireless, and may even be transmitted from the server and/or client antennas. However, since the data rate and hence carrier frequency is substantially lower than the data rate for the primary wireless communications channel, the propagation over the wireless control path is more robust, and does not suffer from the problems experienced for the primary channel.

Suitably, the client and/or the server comprise signal processing circuitry for receiving and transmitting control data between them over the control path.

The client may also comprise signal processing circuitry for determining the quality of a signal received from the server via respective client and server antennas.

The client signal processing circuitry may be operable to steer the client antenna in accordance with control signals received from the server via a control path.

Advantageously, the server antenna is a steerable antenna, which provides for further optimisation of received signal quality by suitably directing-the server antenna. Typically, the server signal processing circuitry is operable to steer the server antenna in a direction in accordance with the signal quality data communicated to it from the client via the control path.

Either one or both of the server and client antennas may be operable to form a complex antenna beam pattern in accordance with respective signals communicated by the control path. This advantageously provides an antenna beam pattern suitable for receiving and optimising signals via multipath propagation.

The server can transmit control data to the client for forming beam patterns and steering the antenna, such that all the processing and control is performed in the server.

In accordance with embodiments of the present invention, there is provided a system which enables transmission of bidirectional data using high carrier frequencies (in the range of 2 to 60 GHz) between a wireless server and wireless client appliances. The system enables optimisation of the available bandwidth of the network by using directional antennas to improve BER. In addition, the system improves flexibility in terms of the physical location of the transmitter and receivers. The receivers can comprise or feed any number of client appliances, such as TV, camcorder, VCR, satellite receivers, DVD, DAB, interactive playstations, personal computers, printers, web TVs, virtual reality shopping centres, educational terminals, wireless books, etc. Each appliance is effectively connected to any other appliance via the wireless LAN to the server. The server may be connected to the Internet service supplier via a high speed connection, in order to provide network access to such services for the above-mentioned client appliances.

Embodiments of the present invention, at the above-described medium carrier frequencies (in the range of 2 to 15 GHz), enable identification of the source of maximum RF carrier power arriving at the receiver(s) as a result reflections and/or diffusion as well. as line of sight. By correctly aligning the beam of the antenna of the appliance and/or the server in the direction of maximum power, not only is BER improved due to the improved signal to noise (S/N) ratio at the receiver(s), but also the effective power received from multipath propagation may be improved for CDMA systems and conversely reduced for TDMA or FDMA systems. The overall result is an improvement in BER performance of the system and/or ability to greatly simplify the equaliser of the receiver and/or the ability to increase the data rate of the system due to the reduction in inter-symbol interference.

With embodiments of the present invention, the sources of maximum RF power arriving at the receiver(s) as a result of reflections and/or diffusion can be identified. Also, the optimum alignment of the beams of the transmitter and/or receiver(s) can be calculated to either limit inter-symbol interference due to multipath propagation or to increase the S/N radio by correct beam alignment. Performance (i.e. BER) of the receiver(s) may be optimised, leading to an improvement in quality for transmission of real time information such as multimedia data. Alternatively, the system can accommodate a larger number of receivers within the LAN or a higher effective data rate for a given carrier frequency or if the equipment is battery operated (e.g. wireless electronic book or PDA) one can reduce the power of the transmitter/receiver for a given performance giving rise to an increase in battery life.

To communicate the status of beam alignment between the wireless client appliance and the wireless server, an alternate communication path for transmitting control and status information is established. The transmission media chosen for the control signal path is such that bidirectional control communications may be maintained even if the main transmitting apparatus/receiving apparatus beams are not aligned (i.e. the main medium or high carrier frequency system is not able to transmit and receive data). Examples of technology that could be used for the control path over a short distance are low frequency wireless telephone (2 GHz carrier or below), modulation of the mains power network, a conventional modem connected to the telephone network, DECT wireless systems or even using a temporary wireline connection.

By utilising an alternate transmission medium/system for the transmission of control and status information, the set up of the system can be automated and effectively one can achieve a "plug and play" network.

Reliance is placed upon the use of steerable multiple element antennas to transmit/receive information in the home or office network. Multiple element steerable antennas have been used in military applications for many years. Using well-known digital signal processing techniques, the amplitude and phase of the antenna elements of the receiver are adjusted to create a signal beam of a maximum gain. By adjusting the relative phases and amplitudes of the receiver(s) antenna elements, the signal beam is swept in both horizontal directions and subsequently in elevation while measuring the received carrier signal strength. The resultant variation in strength of the received signal creates a three-dimensional map of the transmission characteristics of the environment for a given direction of the transmitted beam.

The direction of the transmitted beam is then adjusted by an incremental angle and the procedures are repeated. Using the resulting maps of signal strengths at the receiver(s) for all transmitted beam directions, the spatial gain of the transmitting and receiving antenna(s) are then adjusted for optimised signal reception at the specific carrier frequency. By this invention, there is a combination of the use of a lower frequency control path with the beam sweeping technique to automatically map the transmission characteristics of a home or office environment. Using the resultant map, the spatial gain of the antennas is arranged for optimum transmission. The control of the spatial gain is enacted by transmitting via the control path of the necessary data for optimum configuration of the antennas and their elements.

The control information relayed between the wireless server and the wireless client appliance includes (as a minimum) the carrier frequency in use and the direction of the antenna beams at a given point in time and the resultant measurement of receiver RF power. Optionally, the elevation and/or width of the antenna beams may also be communicated. The control information for each appliance is stored in a temporary memory for future calculations. By comparing the stored results of signal strength of the various orientations of the transmitter and receiver beams, the server can identify the optimum direction in which the beams of the transmitter and receiver should be oriented to maximise the S/N ratio and the achieve optimum performance, in particular in terms of BER. Finally, at the end of the calibration procedure, the server sets the optimum beam configuration at the client and server (for a steerable server antenna) transmitter and receiver for respective transmitter/receiver communication by communicating the preferred settings to the wireless client appliance via the control path.

The calibration procedure can be reenacted on a periodic basis or when the performance of the communication system degrades below a preset limit or when a new wireless client appliance is added to the network.

The process can be repeated for different carrier frequencies or for different azimuth to again select the beam configuration and carrier frequency for optimum reception at the receivers.

By virtue of the principle of reciprocity, the optimum antenna configuration is the same for both the wireless server and a wireless client appliance in either transmit or receive mode.

Optionally, the process can also be repeated for uplink (client appliances to server) transmission of information by treating the client appliance as the transmitter and the server as the receiver.

The system can also be used to provide feedback to the user as to the optimum placement of transmitting and receiving antennas. In many instances, it would be possible to further improve the performance of the network by utilising the information stored in the temporary memory regarding the variation in RF power at the receivers to advise of modifications in the physical location of the receivers. For example, if the maximum powers are recorded in the n−1, nth and n+1 sectors, then the user could be provided with an indication that moving the antenna in the direction of the nth sector and restarting the calibration routine could further improve performance. This option would be of great benefit if the power received in the sector of highest power (nth) is below a preset limit that is deemed to be necessary to ensure adequate BER performance of the system.

Particular and preferred aspects of the invention are set out in the accompanying independent claims. Combinations of features from the dependent and/or independent claims may be combined as appropriate and not merely as set out in the claims.

Illustrative embodiments in accordance with the present invention will now be described, by way of example only, and with reference to the accompanying drawings, in which:

FIG. 6 is a schematic illustration of a CDMA signal; and

Figure 1:
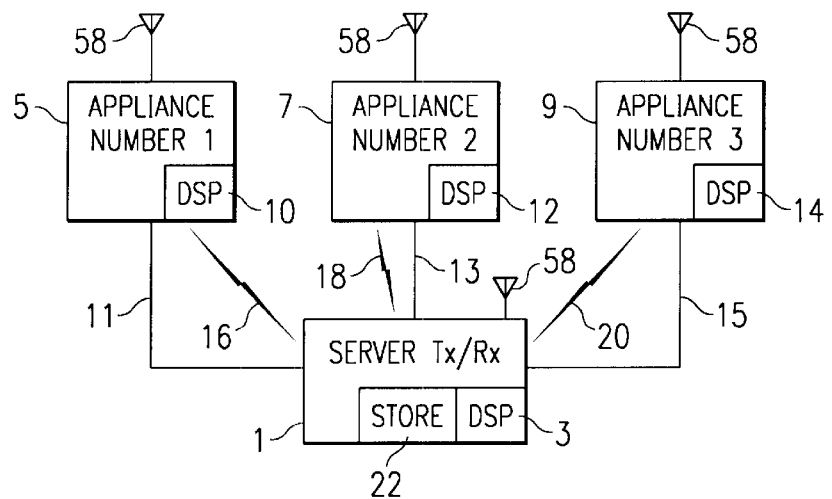
FIG. 1 is a schematic diagram of a system in accordance with an embodiment of the present invention.

Referring to FIG. 1, there is shown a system in accordance with an embodiment of the present invention. The system includes a server 1 having a transmitter section and a receiver section and a steerable beam antenna. In a preferred embodiment, the steerable beam antenna is an electronically steerable beam multi-element antenna. Also included in the server I is a digital signal processor (DSP) or microprocessor or other computing element 3 which is capable of operation on signals sent to or from the server, monitoring the quality of received data and steering the antenna beam by controlling the gain and phase of the server antenna elements in response to received data quality. The computing element is configured to de/modulate, de/encode received or transmitted signals as appropriate, for the signalling protocol utilised by the system. The signalling system may be Time Division Multiple Access (TDMA), Orthogonal Frequency Division Multiple Access (OFDMA) or Code Division Multiple Access (CDMA), for example. Server 1 is coupled to each of a plurality of appliances 5, 7, 9 via low data rate control path 11, 13, 15. The low data rate control path may be transmitted over the electrical power supply lines for each of the appliances and server, a relatively low frequency inductive loop or lossy coaxial line antenna system. Respective appliances may also be coupled to the server by a high speed wireless connection 16, 18, 20. Each of the appliances 5, 7, and 9 respectively also has a steerable beam antenna for reception and optionally for transmission, and a DSP or microprocessor or other computing element 10, 12 and 14 respectively for determining and providing to the server along the control paths 11, 13, 15 appropriate data as to received signal quality, current antenna beam position or direction and other control information, for example.

Figure 2:
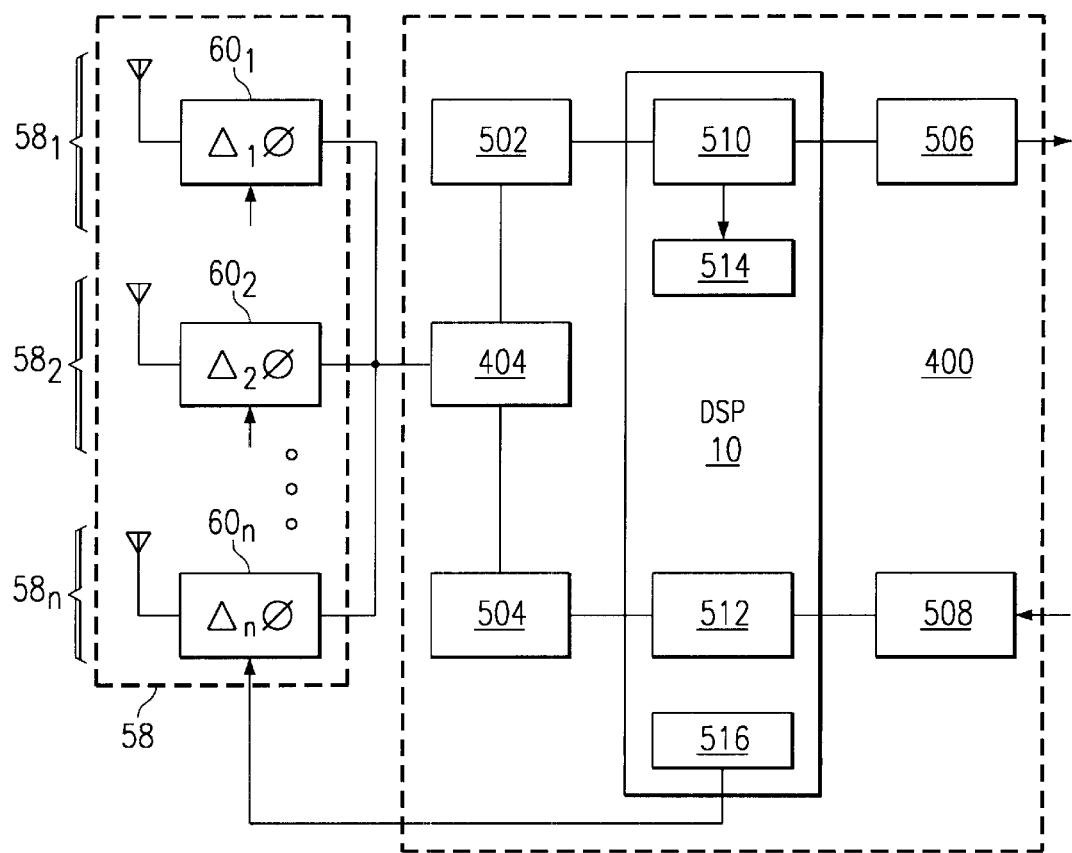
FIG. 2 is a schematic illustration of a wireless transceiver and steerable beam antenna for an embodiment of the present invention.

In a preferred embodiment in accordance with the invention, the transmitter and receiver sections are combined as a transceiver 400, an illustrative example of a wireless client appliance transceiver will now be described with referenced to FIG. 2. The skilled person will recognise that a similar form of transceiver may also be used for the server.

A transceiver 400, described for an wireless client appliance 7 by way of example, includes an antenna switch 404 coupled to the radio frequency front end of the receive and transmit chains 502. 504 respectively. The radio frequency front end 502 typically comprises a low noise amplifier and filter, a first mixer, intermediate frequency filter, and second mixer together with appropriate inputs from a voltage controlled oscillator and frequency synthesiser. Similarly, the radio frequency front end for the transmit chain 504, typically comprises a radio frequency power amplifier, control circuitry for applying power levelling control, together with appropriate inputs from the voltage controlled oscillator and frequency synthesiser referred to above. Exemplary processing circuitry 10, preferably a DSP, comprises a demodulator/decoder unit 510, for demodulating and decoding received signals. The function of the demodulator/decoder 510 is to output signals to the data output chain 506 comprising buffer and output circuitry for coupling to wireless client appliances 5,7,9 or server 1. The demodulator/decoder 510 will operate in accordance with demodulation and decoding schemes for the particular radio communications protocol in operation for the system. Since the particular modulation or decoding scheme is not relevant to the instant invention no further reference to such schemes will be made, except to say that the purpose is to transmit and/or receive data signals between wireless client appliances and server.

Similarly, the processing circuitry 10 also comprises an encoder/modulator unit 512 which receives a data signal from the data receive chain 508 and suitably encodes and modulates the signal ready for outputting to the transmit chain radio frequency front end 504. For reasons mentioned above, no further reference will be made to particular encoding/modulation schemes.

Processing circuitry 10 also comprises a signal quality level measuring unit 514, which receives an output from demodulator/decoder 510 representative of the received signal quality. The signal quality level measurement unit 514 may determine signal quality in a number of ways. For example, the received signal strength may be monitored giving a Received Signal Strength Indicator (RSSI), or the bit error rate, the signal to noise ratio, or carrier to noise ratio of the received signal, may be measured. The receive signal quality level, for example RSSI, may be stored for comparison with a later received signal and/or compared with a threshold level.

The processing circuitry 10 also comprises an antenna beam steering unit 516 for steering the beam of antenna 58. In accordance with a preferred embodiment of the invention, antenna 58 comprises a plurality of antenna elements $58_1$, $58_2 \ldots , 58_n$, each antenna element being driven through respective phase delay and gain circuitry $60_1, 60_2, 60_n$. The phase delay and gain introduced by respective phase delay and gain elements $60_j$ are controlled by antenna beam steering unit 516. Such antenna arrays are often termed "adaptive antennas". The steerable beam antenna 58 need not comprise an electronically steerable beam antenna having a plurality of antenna elements, but may be mechanically steerable, or a combination of mechanically and electrically steerable. Under control of antenna beam steering unit 516, the radiation output from antenna 58 may be formed into a relatively narrow beam, and that beam steered to a desired direction. For a typical wireless network system the beam need only be steered in the azimuthal direction, that is to say substantially horizontal to the earth's surface. However of course, the elevation of the beam may also be steerable should that be required, although the increased complexity required to provide an extra steerable direction may preclude such a feature on commercial grounds. However, it can be envisaged that for certain applications, e.g. server and wireless client appliances on different floors of a building, may require both azimuthal and elevational steerability.

In general, embodiments of the invention configure a server antenna 56, which may be located proximal to the server apparatus/r remote therefrom; to form a relatively narrow antenna beam pattern. The antenna beam width may be of the order of 15°, 20° or 30°, for example, but the exact beamwidth is not pertinent to the present invention and the foregoing beamwidths are merely illustrative examples. For each server antenna beam direction, a similarly narrow antenna beam, although not necessarily the same, for an wireless client appliance antenna 58 is stepped through each of its beam directions. For each beam direction, the Received Signal Strength Indication (RSSI) value is measured, that is to say a measure of the power received at the wireless client appliance antenna 58. Respective antenna beam directions and configurations, together with the corresponding RSSI, are transmitted over the low data rate path to the server which stores it in a database. Once all the antenna beam directions for a respective wireless client appliance have been stepped through, then the next antenna beam direction for the server antenna 56 is set up and, again, all the antenna beam directions for the wireless client appliance antenna 58 are stepped through with respective RSSI values transmitted and stored at the server. Once this process has been completed for all server antenna 56 beam directions, it is then repeated for the next wireless client appliance. In this way, a table of server and respective wireless client appliance antenna team configurations, together with corresponding RSSI values may be created, and examined to find optimum antenna beam configurations for respective server/wireless client appliance pairs. An example of a particular server/wireless client appliance physical configuration will now be described with reference to FIG. 3 and an illustrative embodiment of a suitable process for controlling a system will be described with reference to FIG. 4.

In accordance with an embodiment of the invention, server 1 initiates an automatic calibration routine for setting up an optimum beam direction for server 1 antenna 56 and respective wireless client appliance antennas 58. In the illustrative example of FIG. 3, wireless client appliance 7 is placed in a separate room from server 1. A server 1 antenna, 56, is shown having a relatively narrow beam pattern 40.

Figure 3:
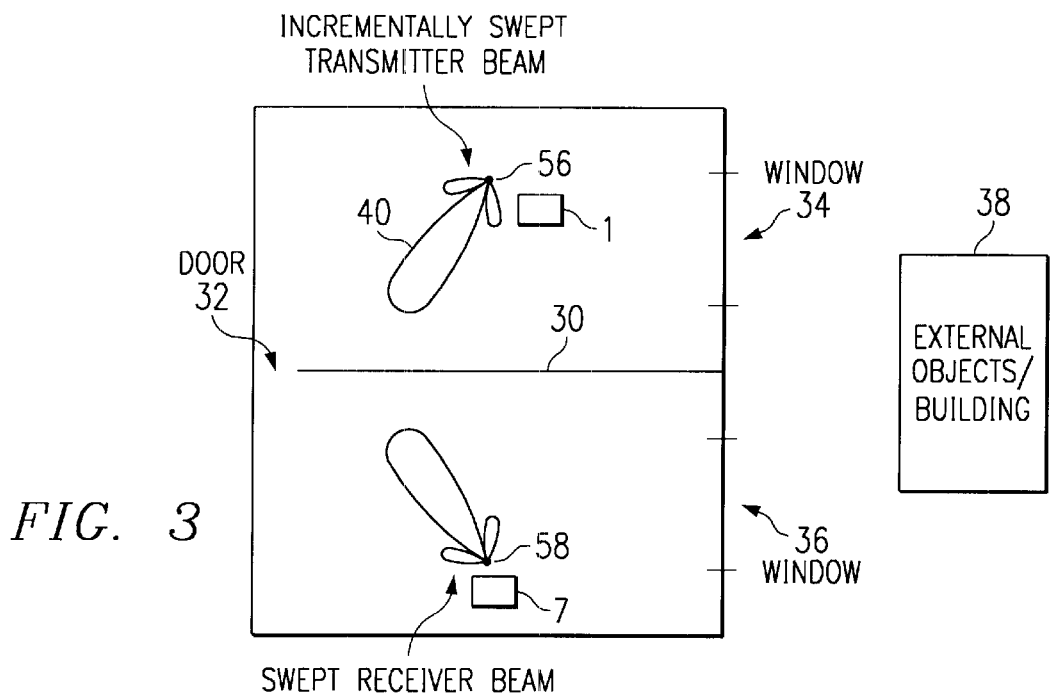
FIG. 3 is a diagram showing commencement of calibration of an antenna in accordance with an embodiment of the present invention.

Antenna 56 need not be located proximal to server 1, but may be located away from it in a convenient location, such as in the middle of a ceiling, on a wall or corner of a room in order to have a potentially wide coverage area. Antenna 56 can then be coupled to the appropriate server 1 by a suitable cable connection. In the example of FIG. 3, the server antenna 56 is separated from the wireless client appliance 7 and wireless client appliance antenna 58 by a partition or wall 30. The partition or wall 30 has a doorway 32 to one side, and to the other side there are windows 34 and 36 in the respective rooms. Additionally, there is an external object 38 such as a building positioned outside of windows 34 and 36.

Figure 4:
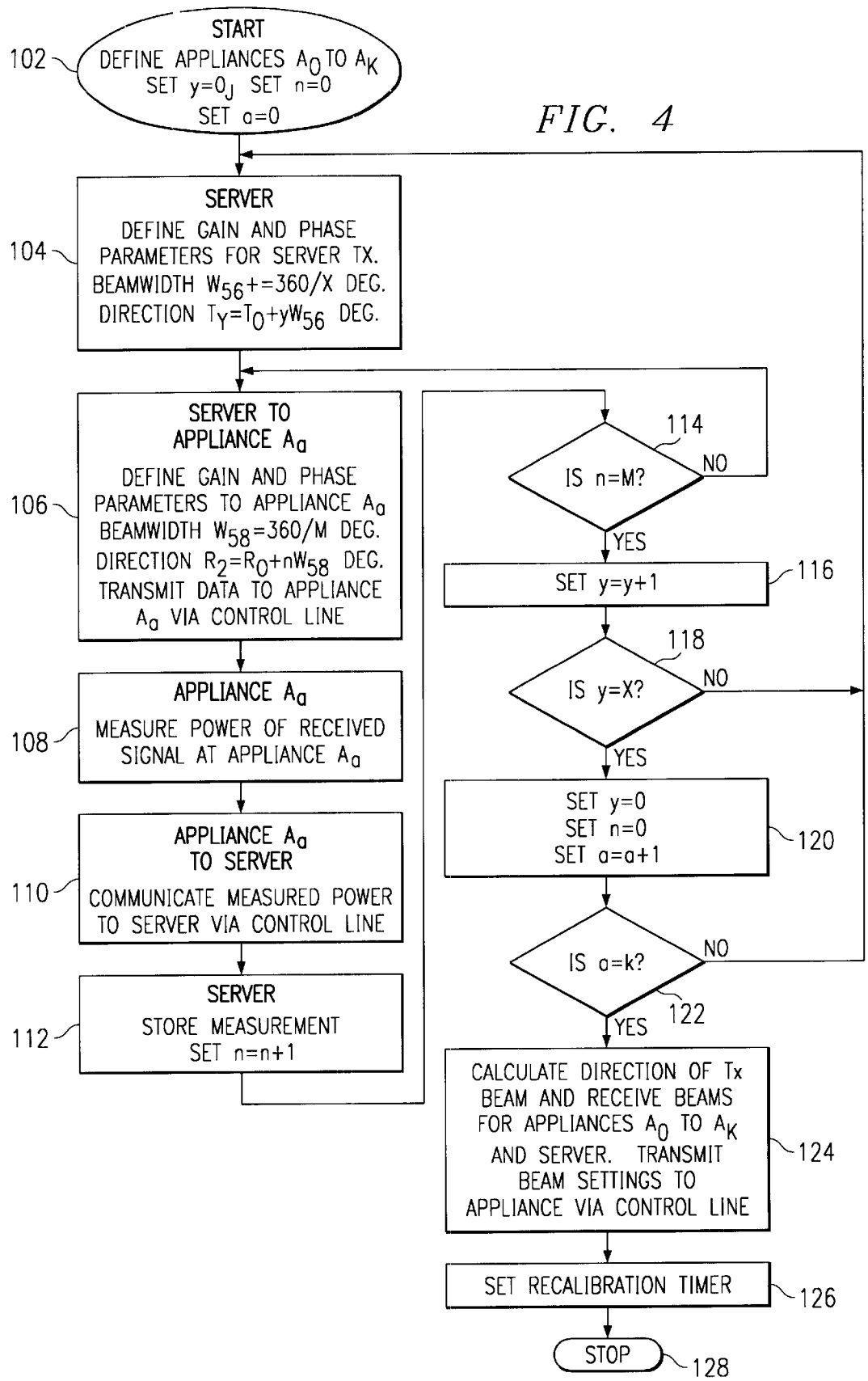
FIG. 4 illustrates a flowchart for operating an antenna network system in accordance with an embodiment of the invention.

In accordance with an embodiment of the invention, server 1 initiates an automatic antenna beam calibration routine for setting up optimum antenna beam directions for server 1 antenna 56 and respective wireless client appliance antennas 58. FIG. 4 illustrates a flowchart showing the steps taken by server 1 and wireless client appliance 7 having appropriately configured DSPs 3, 10 or other computing means. Typically, the DSPs or computing means will be configured by means of a computer program comprising computer-implementable instructions causing respective computing means 3, 10 to operate in accordance with respective parts of the flowchart.

At step 102, the beam calibration routine starts. Server 1 acts as a control head for the wireless system, and either knows in advance which wireless client appliances "A" are within its area of influence, or optionally sends out control signals over the low data rate path requesting respective wireless client appliances to identify themselves. Any suitable communications protocol may be utilised for this identification process, and the ordinarily skilled person would be aware of such suitable protocols. During this initialisation process, the server 1 creates a database of identified wireless client appliances which it stores within a memory local to the server, for example a semiconductor memory device or magnetic medium memory device. A variable, y, representing the number of discrete antenna boresight directions to be utilised by the server antenna 56 and a variable n representing the number of antenna boresight directions for an wireless client appliance antenna 58 are set to 0. Additionally, in the illustrative flowchart, a variable a is set to 0, where a is a subscript denoting respective wireless client appliances i.e. $A_0$ to $A_K$.

Process control then flows to step 104 where the gain and phase parameters for the server antenna 56 are set to generate an antenna beam having a beam width $W_{56}$ equal to 360°/X, where X equals the total number of antenna beam boresight directions for antenna 56. The direction $T_y$ equals $T_0+yW_{56}°$ which initially sets the antenna up on a reference direction $T_0$. At step 106, the gain and phase parameters for wireless client appliance $A_a$ are set where the antenna 58 beamwidth $W_{58}$ equals 360°/M where M is the number of antenna beam boresight directions for antenna 56. The direction of the antenna beam $R_n$ equals $R_0+nW_{58}°$. Initially, the direction R equals $R_0$ which may be an arbitrary starting direction. In a preferred embodiment of the invention, server 1 acts in the capacity of a control head which determines the initial set up parameters for both the server antenna 56 and wireless client appliance antennas 58. The final action in step 106 is for the server to send the relevant beam set-up parameters to wireless client appliance $A_a$. Optionally, once wireless client appliance $A_a$ has been informed via the low data rate path that the server is initiating an antenna beam direction set-up routine, electronics associated with antenna 58, for example a part of the wireless client appliance $A_a$ may define the relevant set-up parameters for the antenna. However, those parameters have to be transmitted to the server for storing in its database.

At step 108, server 1 transmits a wireless signal for wireless client appliance $A_a$ and the power of the signal (RSSI) received by antenna 58 for wireless client appliance $A_a$ is measured.

At step 110, the RSSI measured for $A_a$ is communicated to server 1 via the low data rate control path, and the RSSI value is stored in the server for the particular configuration of both the server antenna 56 and wireless client appliance antenna 58, at step 112. Then, n is incremented by 1. At step 114, it is determined whether or not the value of n is equal to M. If "no", process control flows back to step 106 where the direction of the antenna beam for wireless client appliance $A_a$ is moved on 1 segment, i.e. the value of n is incremented. Steps 106, 108, 110, 112 and 114 are then performed again until n is equal to M, indicating that the wireless client appliance antenna beam has been stepped through 360° in steps of 360°/M. For n equal to M, the flow chart proceeds to step 116 where the value of y is incremented by 1.

At step 118, it is determined whether or not y equals X, and if "no", process control flow returns to step 104 where the server antenna 56 beam is stepped onto the next direction. Steps 104 to 118 are repeated until y equals X, at which point process control flows to step 120.

At step 120, the variables y and n are initialised to 0, and the variable A is incremented by 1. Thus, the server antenna 56 beam direction is reinitialised for the next wireless client appliance $A_{a+1}$ and the respective wireless client appliance antenna 58 is also initialised. At step 122, it is determined whether or not a equals k and if not, process control flows back to step 104 and continues through to step 122. If a equals k at step 122, the flow chart proceeds to step 124 where the server reviews the database of stored antenna configurations and RSSI values to determine which combined antenna configuration (server antenna beam and apparatus antenna beam direction) provide the greatest RSSI value for respective server/wireless client appliance combinations. The optimum beam settings are then transmitted over the low data rate path to respective wireless client appliances $A_a$. Thus, both the server antenna 56 and respective wireless client appliance antennas 58 have beam patterns configured for optimum reception and transmission of signals.

The process control then flows to step 126 where an interval timer for setting the interval between antenna beam set-up routines is reset. The set-up routine then stops at step 128.

A wireless network system having server and respective wireless client appliances operated and configured in accordance with the illustrated flowchart provide a means for automatically setting the optimum beam directions for respective server antenna 56 and wireless client appliance antennas 58. By performing the set-up routine at predetermined intervals, it is possible to adjust for any changes in the environment, for example a door being shut or left open, windows being opened or the temporary presence of human bodies, for example. Optionally, server 1 may be configured to automatically initiate the antenna beam set-up routine, should it experience a prolonged difficulty in communicating with one or other wireless client appliance via the high data rate channel, having confirmed that that wireless client appliance is present by virtue of the low data rate path.

Although the control process illustrated with reference to the flowchart of FIG. 4 involves setting up respective antenna beam directions for the server antenna 56, antenna 56 may optionally be configured to operate in omnidirectional mode and merely the wireless client appliance antennas 56 stepped through respective directions. This advantageously reduces the processing and memory capacity required for the automatic antenna beam set-up routine.

Figure 5:
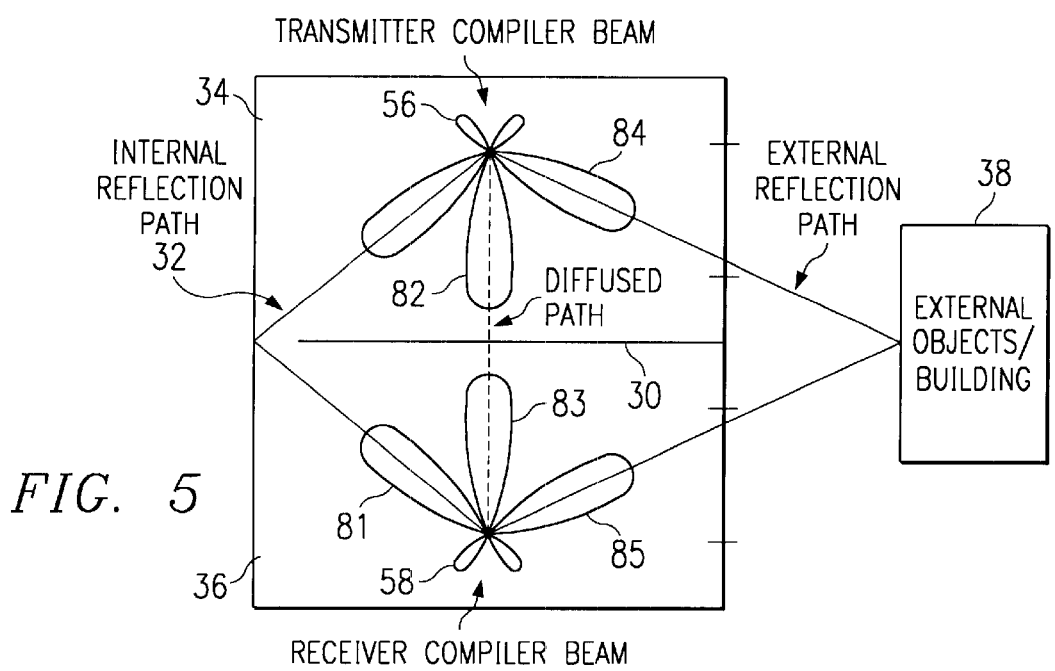
FIG. 5 is a diagram showing the operational beam configuration of a server and appliance antenna after complication of calibration.

FIG. 5 illustrates possible antenna beam pattern configurations which may be found to be optimal for a particular server antenna 56 and apparatus antenna 58 configuration.

As mentioned earlier, carrier frequencies having or capable of supporting suitable data rates for a wireless data network may be split into two regions. The first, lower, region comprises frequencies up to 15 GHz, typically in the region 2 to 15 GHz. The upper region is typically from 15 GHz to 60 GHz. It should be noted that the particular ranges specified herein typical ranges having the general characteristics ascribed to respective lower and upper frequency ranges and are not limiting. It will be evident to a person of ordinary skill that the boundaries of these regions may vary without there being a sudden shift in characteristics, that is to say the lower frequency range may extend from 1 GHz to 10 GHz for example, and the upper frequency range from 10 GHz to 50 GHz, their respective characteristics being substantially the same as the range 2 to 15 GHz and 15 to 60 GHz.

Problems ascribed to the lower frequency range are that multipath propagation of signals leads to inter-symbol interference at the receiver antenna. This is particularly disadvantageous for video data applications where data arriving out of sequence requires considerable buffering in order to arrange it in sequence which leads to a significant processing overhead and consequent reduction in performance. Inter-symbol interference itself can lead to a significant increase in bit error rate over and above that which would be ascribed to the signal-to-noise ratio measured for the particular communications channel. Advantageously, at such low region frequencies, walls, partitions, human bodies do not inhibit the transmission of the carrier frequencies entirely. It is possible for the carrier waves to be diffused through a barrier or diffract around it. Thus, with such a frequency range identification of the primary or greatest signal direction may be all that need be identified. Once this has been identified, directing the antenna beam in that direction will significantly reduce inter-symbol interference since multipath signals are not being received, and furthermore there will be greater gain in the narrow beam direction.

In the higher frequency region, the carrier frequencies do not diffuse through barriers such as walls or partitions particularly well, and therefore it is primarily by means of multipath propagation that signals can be transmitted from a server antenna 56 to an wireless client appliance antenna 58, for example. Use of multipath signals can be used to obtain adequate signal strenght at the receiver for TDMA and FDMA systems for example. Particularly advantageous is a wireless protocol known as CDMA which is characterised by the fact that it utilises multipath signals to create a composite received signal.

Figure 7:
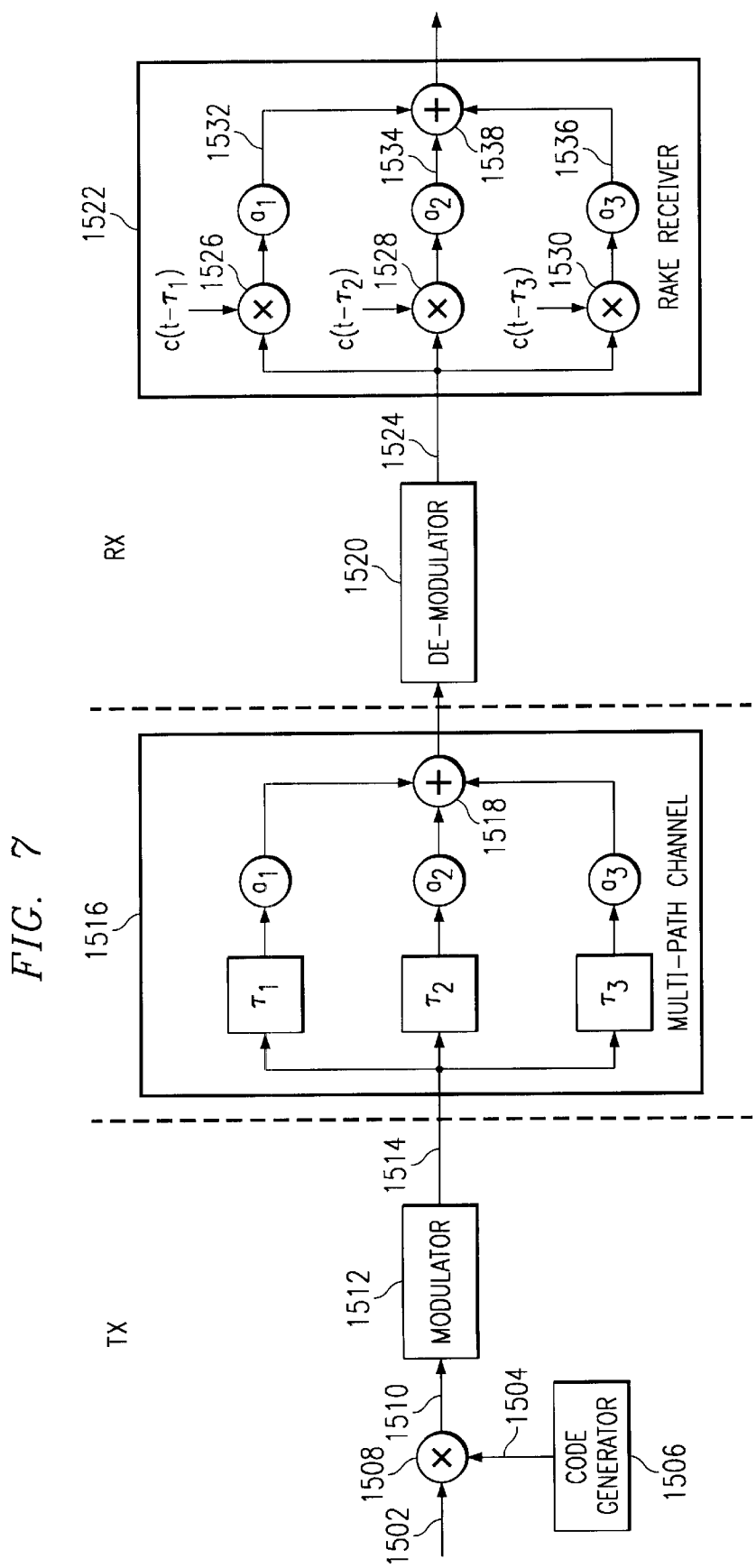
FIG. 7 is a schematic illustration of a CDMA system.

A brief description of the general principles of CDMA will now follow, with reference to FIGS. 6 and 7 of the drawings. A data signal as shown in FIG. 6(a) is modulated by a CDMA spreading code illustrated in FIG. 6(b). Although only a data signal is illustrated in FIG. 6(a), the data signal may previously have been modulated by an RF carrier signal. However, in the case of a digital signal, it is usually the fact that data modulation is omitted and the data signal is directly multiplied by the code signal which modulates the carrier frequency.

The result of the spreading code multiplied by the data signal is illustrated in FIG. 6(c). The code signal consists of a number of code bits called "chips" which can be either +1 or −1. In order to obtain a suitable spreading of the data signal, the chip rate of the code signal must be much higher than the chip rate of the information or data signal. A figure of 10 code chips per data or information symbol is a typical ratio, resulting in a processing gain of 10. The spread signal as illustrated in FIG. 6(c) is then transmitted.

Referring now to FIG. 7, there is provided a simplified diagram of a CDMA system. A data signal 1502 and code signal 1504 originating from code generator 1506 are input to mixer 1508. The spread data signal 1510 is then input to modulator 1512 for modulating a radio frequency carrier. The modulated signal 1514 is then transmitted into the environment which is modelled as a multi-path channel 1516.

In the example illustrated in FIG. 7, the radio propagation environment is modelled as three separate channels having different delays $\tau_1$, $\tau_2$ and $\tau_3$ with corresponding attenuation factors $a_1$, $a_2$ and $a_3$. The three separate multi-path signals effectively combine, 1518, at the antenna for the receiver and are forwarded to the demodulator 1520.

The signal from the demodulator is input to a so-called RAKE receiver 1522, which has a finger for each multi-path component it is desired to decode. The signal 1524 output from the demodulator 1520 is split into each of the fingers, 3 in the present example, and forwarded to respective mixers 1526, 1528 and 1530. Input to respective receivers 1526, 1528 and 1530 are respectively delayed spreading codes C(T-$\tau_1$), C(T-$\tau_2$) and C(T-$\tau_3$), where the spreading code C corresponds to that in code generator 1506. The signal output from respective modulators is input to respective gain circuitry $a_1$, $a_2$ and $a_3$, corresponding to the attenuation experienced in the multi-path environment. The attenuated signals 1532, 1534 and 1536 are then combined at 1538 and forwarded to further demodulation and coding circuitry of the receiver.

CDMA systems utilise the reception of multi-path signals. A RAKE receiver, such as described with reference to FIG. 7, receives the multi-path signals and correlates them with the receiver spreading code in order to coherently combine them to provide a single received signal at the output of the RAKE receiver. In order to optimise a received signal in a CDMA system, the beam pattern may be configured in accordance with the phase and gain values utilised in the RAKE receiver during a beam set-up procedure to the optimise pattern for multi-path signals.

Referring now to FIG. 5, for a lower region of carrier frequencies, one of antenna beam combinations 80/81, 82/83 or 84/85 might be used to identify a primary or greatest signal path. However, for an upper region, an antenna pattern comprising a combination of antenna beams 80 and 84 with 81 and 85 might be used in order to optimise the reflected or multipath signals at the received antenna.

An embodiment of the invention may be utilised in the High Performance Radio LAN (HIPERLAN) system types 1 or 2, proposed by the European Technical Standards Institute. HIPERLAN is a radio or wireless LAN system operating at carrier frequencies in the Gigahertz frequency range, typically 5.15–5.30 GHz. The HIPERLAN system uses Orthogonal Frequency Division Multiplexing, and has guard bands around data bursts to provide for adequate equalisation of received signals. Equalisation is necessary since the system is intended for office or interior use which is a highly reflective environment. Utilisation of steerable beam antennas reduces the reception of multiple reflected signals and hence reduces the need for equalisation. Thus equalisation can be made more simple or even unused. This reduces the need for guard bands hence increasing the available bandwidth for transmission of data. Additionally, any training sequences used for equalisation can be reduced or removed, thereby further increasing the available data bandwidth.

Another feature of HIPERLAN is that different modulation or coding techniques are used depending on the S/N for the communication channel in use. The system automatically changes the modulation or coding technique for changes in the SIN, such that for low S/N the coding has high redundancy, and for high S/N the coding has low redundancy. Since reduction in S/N may be due to changes in the environment of the HIPERLAN, e.g. doors opening or closing, re-calibration of the network antennas beam directions or patterns might be necessary. Thus, changes in the modulation or coding technique may be used to initiate re-calibration of the network. Preferably, changes to a technique having higher redundancy than in current use initiate re-calibration.

In view of the foregoing description it will be evident to a person skilled in the art that various modifications may be made within the scope of the invention.

Although the foregoing embodiments have been described with reference to a signal transmitted from a server antenna 56 to an wireless client appliance antenna 58, a person ordinarily skilled in the art would under the principle of reciprocity and appreciate that the same applies for transmission and reception in either direction between respective server antenna 56 and wireless client appliance antenna 58. Additionally, the low data rate path may be implemented by means of the power supply lines typically found in a building as previously mentioned, or by means of a low frequency lossy coax antenna system, by modem and conventional telephone systems or by a wireless telephone system such as DECT, for example. An important element of the low data rate path, is that it is always present and that the server may communicate with respective wireless client appliances via that path.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated. to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. An antenna network system comprising:
   a transmitter and a first steerable antenna;
   a receiver and a second steerable antenna, said transmitter and said receiver comprising a primary wireless channel wherein an optimal transmission path between said transmitter and said receiver is one of a straight line path and a reflected path;
   a control path coupled to said transmitter and said receiver and independent of said primary channel, for communicating control data between said transmitter and said receiver; and
   control means responsive to quality measurement data for said primary channel and communicated via said control path, said measurement data including measured quality data for a signal transmitted from said transmitter and received by said receiver for each of a plurality of antenna directions for each of said first and second steerable antennas, said control means steering each of said steerable antennas in one of said antenna directions having best measured quality.

2. The antenna network according to claim 1 further comprising a server, said server including said transmitter and said first steerable antenna; a client, said client including said receiver and said second steerable antenna and wherein said control path is coupled between said client and server.

3. The antenna network system according to claim 2 wherein said server and client respectively comprise signal processing circuitry for receiving and transmitting control data therebetween.

4. Twice Amended The antenna network system according to claim 3, wherein said client comprising signal processing circuitry for determining the quality of a signal received from said server over said primary communications channel.

5. The antenna network system according to claim 3, wherein said client signal processing circuitry operable to steer said client antenna in accordance with control signals received from said server over said control path.

6. The antenna network system according to claim 5 wherein said client and/or server signal processing circuitry operable to form an antenna beam pattern in accordance with respective signals communicated via said control path.

7. The antenna network system according to claim 3 wherein said server antenna comprising a steerable antenna.

8. The antenna network system according to claim 7, wherein said server signal processing circuitry operable to steer said server antenna in accordance with said signal quality data communicated via said control path.

9. The antenna network system according to claim 2 wherein said server includes a receiver and said client includes a transmitter.

10. The antenna network system according to claim 2 further comprising a plurality of clients.

11. The antenna network system according to claim 2 wherein said client and/or server signal processing circuitry is operable to form an antenna beam pattern in accordance with respective signals communicated via said control path.

12. The antenna network system according to claim 1, said control path operable at a lower data rate than said primary channel.

13. The antenna network system according to claim 1 wherein, said control path comprises a power supply line, telephone system, cable system, DECT cordless telephone system or wireless channel.

14. A method for calibrating an antenna network having a wireless channel, comprising:
  a) providing an antenna network system wherein an optimal transmission path between a transmitter and a receiver for said wireless channel is one of a straight line path and a reflected path, said antenna network system comprising a steerable server antenna, a steerable client antenna and a control path coupled to said transmitter and said receiver and independent of said wireless channel;
  b) transmitting a wireless signal from said server antenna at one of a plurality of antenna directions;
  c) receiving said wireless signal at said client antenna at one of a plurality of antenna directions, and measuring a quality for said received signal;
  d) transmitting data for said measured quality from said client to said server over said control path;
  e) repeating steps b) and c) for each one of said plurality of antenna directions;
  f) steering said server antenna and said client antenna in one of said antenna directions having best measured quality.

15. The method according to claim 14, wherein said server antenna comprising a steerable antenna, the method further comprising steering said server antenna in a plurality of directions, and receiving said wireless signal at said client antenna for each one of said plurality of directions for said client antenna for each of said plurality of directions for said server antenna.

16. The method according to claim 15 further comprising said server communicating data for steering or beam forming said client antenna to said client.

17. The method according to claim 14 further comprising said server communicating data for steering or beam forming said client antenna to said client.

18. The method according to claim 14 further comprising communicating data corresponding to said noted received signal quality for respective client antenna directions to said server over a control path independently operable of a primary wireless communications channel between said server and client antennas.

19. The method according to claim 18, wherein said data comprising respective received signal quality values and corresponding client antenna direction information.

20. The method according to claim 18 further comprising forming a database of said data, searching said data for a client antenna direction yielding optimum signal quality and communicating control signals over said control path to said client antenna for steering said client antenna in an optimum direction.

21. The method according to claim 20, further comprising forming said database with data corresponding to said server antenna direction, searching for a server antenna direction and client antenna direction pair yielding optimum signal quality, and steering said server antenna and said client in respective directions for said optimum signal quality.

* * * * *

UNITED STATES PATENT AND TRADEMARK OFFICE
CERTIFICATE OF CORRECTION

PATENT NO.    : 6,498,939 B1  
DATED         : December 24, 2002  
INVENTOR(S)   : David R. Thomas It is certified that error appears in the above-identified patent and that said Letters Patent is hereby corrected as shown below:

Title page,
Item [30], immediately following Item [22], please insert the following:
-- [30]   Foreign Application Priority Data

July 20, 1999  [EP]     European...................9941814.1 --

Signed and Sealed this

Ninth Day of September, 2003

JAMES E. ROGAN
*Director of the United States Patent and Trademark Office*